(12) United States Patent
Chillar et al.

(10) Patent No.: US 9,091,206 B2
(45) Date of Patent: Jul. 28, 2015

(54) SYSTEMS AND METHODS FOR INLET FOGGING CONTROL

(75) Inventors: Rahul J. Chillar, Atlanta, GA (US); Chayan Mitra, Bangalore Karnataka (IN); Julio Enrique Mestroni, Marietta, GA (US); Sandip Maity, Bangalore Karnataka (IN); Rachit Sharma, Bangalore Karnataka (IN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 987 days.

(21) Appl. No.: 13/232,002

(22) Filed: Sep. 14, 2011

(65) Prior Publication Data

US 2013/0061597 A1 Mar. 14, 2013

(51) Int. Cl.
*F02C 7/04* (2006.01)
*F02C 7/143* (2006.01)

(52) U.S. Cl.
CPC ............... *F02C 7/04* (2013.01); *F02C 7/1435* (2013.01); *F05D 2270/16* (2013.01); *F05D 2270/804* (2013.01); *F05D 2270/806* (2013.01); *F05D 2270/8041* (2013.01)

(58) Field of Classification Search
CPC .............. F02C 7/04; F02C 7/14; F02C 7/143; F02C 7/1435; F05D 2260/212
USPC ............................ 60/39.53–39.54, 39.3, 775; 137/15.1–15.2
See application file for complete search history.

(56) References Cited

U.S. PATENT DOCUMENTS

| | | | |
|---|---|---|---|
| 4,641,524 A * | 2/1987 | Tarvin | 73/335.01 |
| 5,278,626 A * | 1/1994 | Poole et al. | 356/36 |
| 6,250,064 B1 * | 6/2001 | Tomlinson et al. | 60/775 |
| 7,188,475 B2 * | 3/2007 | McGinley et al. | 60/726 |
| 7,340,902 B2 * | 3/2008 | Jimenez Haertel et al. | 60/775 |
| 7,345,280 B2 | 3/2008 | Mitra et al. | |
| 7,381,954 B2 | 6/2008 | Banerjee et al. | |
| 7,712,301 B1 * | 5/2010 | Wagner | 60/39.53 |
| 7,950,240 B2 * | 5/2011 | Nemet et al. | 60/775 |
| 2004/0255596 A1 * | 12/2004 | Horii et al. | 60/775 |
| 2006/0075755 A1 | 4/2006 | Haertel et al. | |
| 2007/0299561 A1 * | 12/2007 | Montaser et al. | 700/283 |
| 2008/0054100 A1 * | 3/2008 | Rosell et al. | 239/337 |
| 2009/0107214 A1 * | 4/2009 | Cox et al. | 73/29.02 |
| 2010/0085546 A1 * | 4/2010 | Van Dooren et al. | 355/30 |
| 2010/0326083 A1 | 12/2010 | Bland | |

FOREIGN PATENT DOCUMENTS

WO    2004025102 A1    3/2004

OTHER PUBLICATIONS

EP Search Report and Written Opinion dated Mar. 13, 2014 issued in connection with corresponding EP Application No. 12184194.4.

* cited by examiner

*Primary Examiner* — Andrew Nguyen
(74) *Attorney, Agent, or Firm* — Sutherland Asbill & Brennan LLP

(57) ABSTRACT

The present application provides an inlet air fogging system for a gas turbine engine. The inlet air fogging system may include a fogging nozzle array and a fogging control system in communication with the fogging nozzle array. The fogging control system may include a droplet size measurement system and a humidity level measurement system.

14 Claims, 5 Drawing Sheets

SYSTEMS AND METHODS FOR INLET FOGGING CONTROL

TECHNICAL FIELD

The present application and the resultant patent relate generally to gas turbine engines and more particularly relate to systems and methods for inlet fogging control using multiple optical sensing techniques with continuous feedback for inlet cooling.

BACKGROUND OF THE INVENTION

Various strategies are known for increasing the amount of power that a gas turbine engine may be able to produce. One method of increasing the power output of a gas turbine engine is by cooling the inlet air before compressing it in the compressor. Such cooling causes the air to have a higher density so as to create a higher mass flow rate into the compressor. The higher mass flow rate of the air in a compressor allows more air to be compressed so as to allow the gas turbine engine to produce more power. Additionally, cooling the inlet air temperature increases the overall efficiency of the gas turbine engine.

Given such, fogging systems may be used about a compressor inlet section so as to provide a stream of water droplets to cool the incoming flow of air. The fogging system generally may be controlled by the humidity of the incoming flow of air. For example, humility sensors and temperature sensors may be positioned about the compressor inlet so as to measure the humidity of the incoming flow. Based on the readings of the humidity and temperature, the fogging system may calculate how much water can be evaporated and may inject such an amount into the flow of air. Drawbacks with such a fogging system, however, include the facts that not all of the water evaporates, that there may be insufficient residence time for the water to evaporate, that the water droplets tend to agglomerate, and that these water droplets may form projectiles that can hit the compressor blades so as to cause pitting and other types of damage. Localized temperature depressions also may cause water to drop out of the airstream and cause erosion.

There is thus a desire for an improved control system for an inlet fogging system or other type of inlet air cooling system for use with a gas turbine engine. Preferably such a system, based on real time measurements, can control the size of the water droplets and the amount of water injected in the incoming flow of air so as to avoid damage to the compressor blades while promoting overall turbine efficiency and power output.

SUMMARY OF THE INVENTION

The present application and the resultant patent thus provide an inlet air fogging system for a gas turbine engine. The inlet air fogging system may include a fogging nozzle array and a fogging control system in communication with the fogging nozzle array. The fogging control system may include a droplet size measurement system and a humidity level measurement system.

The present application and the resultant patent further provide a method of operating an inlet air fogging system with a number of droplets therein. The method may include the steps of determining a humidity level in the number of droplets, calculating a moisture fraction level from the humidity level, comparing the calculated moisture fraction level to a desired moisture fraction level, determining a size distribution of the number of droplets, comparing the determined size distribution to a desired size distribution, and changing the size of the droplets if the calculated moisture fraction level is greater than the desired moisture fraction level and if the determined size distribution is greater than the desired size distribution.

The present application provides an inlet air fogging system for a gas turbine engine. The inlet air fogging system may include a fogging nozzle array and a fogging control system in communication with the fogging nozzle array. The fogging control system may include a particle imaging velocimetry system or a phase doppler anemometry system and a tunable diode laser absorption spectroscopy system.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
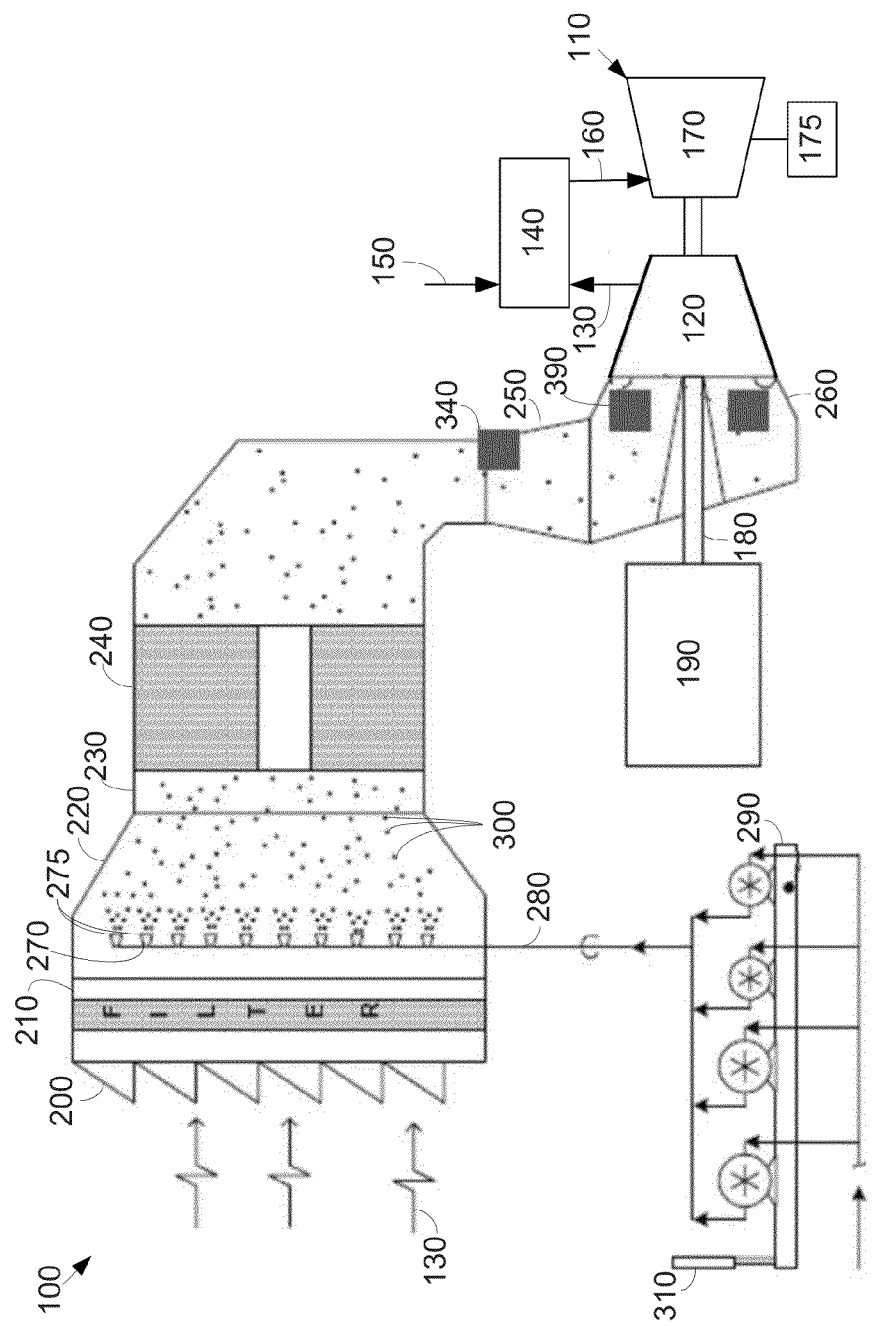
FIG. 1 is a schematic view of a gas turbine engine with a fogging system and a fogging control system as may be described herein.

Referring now to the drawings, in which like numerals refer to like elements throughout the several views, FIG. 1 shows an inlet air fogging system 100 as may be described herein. The inlet air fogging system may be used with a gas turbine engine 110. The gas turbine engine 110 may include a compressor 120. The compressor 120 compresses an incoming flow of air 130. The compressor 120 delivers the compressed flow of air 130 to a combustor 140. The combustor 140 mixes the compressed flow of air 130 with a compressed flow of fuel 150 and ignites the mixture to create a flow of combustion gases 160. The flow of combustion gases 160 is delivered in turn to a turbine 170. The flow of combustion gases 160 drives the turbine 170 so as to produce mechanical work. The turbine 170 may drive the compressor 120 via a shaft 180 and an external load 190 such as a generator and the like. A load sensor 175 may determine the load on the turbine 170. The gas turbine engine 110 may use natural gas, various types of syngas, and other types of fuels. The gas turbine engine 110 may be any one of a number of different gas turbine engines offered by General Electric Company of Schenectady, N.Y. and the like. Other components and other configurations may be used herein.

The inlet air fogging system 100 may include a weatherhood 200 mounted on an inlet filter house 210 with the incoming flow of air 130 passing therethrough. The weatherhood 200 may prevent weather elements such as rain, snow, and the like from entering therein. The weatherhood 200 and the inlet filter house 210 may be largely of conventional design. The flow of air 130 then may flow through a transition piece 220 and an inlet duct 230. A silencer section 240 also may be used herein. The flow of air 130 then may pass through an inlet plenum 250 and into the compressor 120 for compression and combustion as described above. A bellmouth 260 may be positioned about the compressor 120. Other components and other configurations may be used herein.

The inlet fogging system 100 also may include a fogging nozzle array 270. The fogging nozzle array 270 may have any number of nozzles 275 therein. The nozzles 275 may have any size, shape, or orientation. The fogging nozzle array 270 may be positioned about the inlet filter house 210 and the transition piece 220 or elsewhere. The fogging nozzle array 270 may be in communication with a flow of water 280 positioned on a water skid 290 or other type of water source. A weather station 310 may be positioned about the inlet filter house 210, the water skid 290, or elsewhere. The weather station 310 may be used to determine local ambient weather conditions, including temperature, humidity, and other parameters as desired. Other components and other configurations may be used herein.

Figure 2:
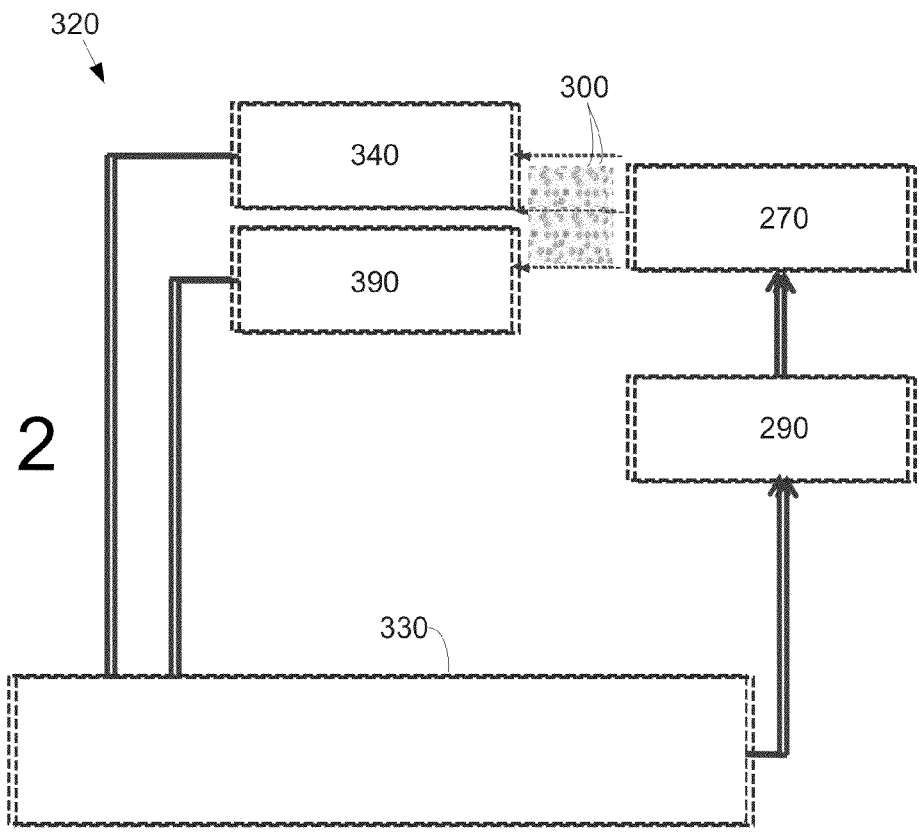
FIG. 2 is a schematic view of the fogging control system of FIG. 1.

As is shown in FIG. 2, the inlet air fogging system 100 also may include a fogging control system 320. The fogging control system 320 may include a controller 330. The controller 330 may be programmed with various control algorithms and other types of software to operate and regulate the inlet air fogging system 100 and the gas turbine engine 110. Multiple controllers 330 with specific tasks also may be used herein. The controller 330 may be in communication with the water skid 290 to control the flow rate of the flow of water 280 that may be delivered to the fogging nozzle array 270. The controller 330 also may be in communication with the load sensor 175, the weather station 310, and other type of inputs. Many different types of operating parameters may be accommodated herein. Other configurations and other components may be used herein.

Figure 3:
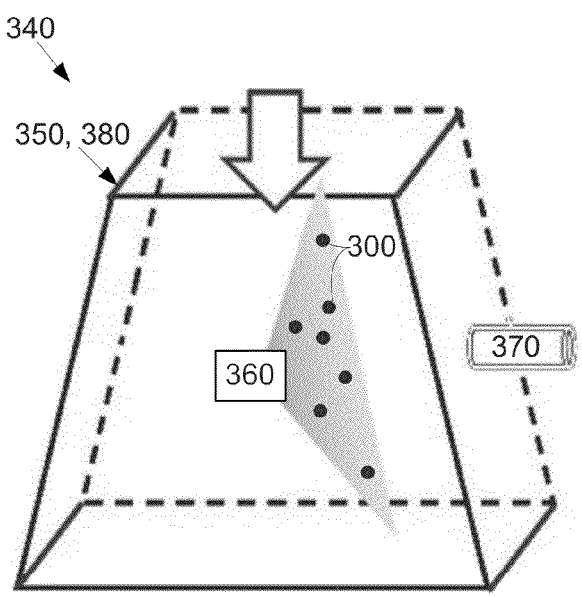
FIG. 3 is a schematic view of a particle imaging velocimetry system and/or a phase doppler anemometry system as may be used in the fogging control system of FIG. 2.

The fogging control system 320 also may be in communication with a droplet size measurement system 340 to determine the size of the droplets 300 in the flow of air 130. As is shown in FIG. 3, the droplet size measuring system 340 may be positioned about the inlet plenum 250 or the bellmouth 260 upstream of the compressor 120. As is described below, different types of droplet size measurement systems 340 may be used herein.

The droplet size measurement system 340 may be a large area particle imaging velocimetry ("PIV") system 350. Generally described, the PIV system 350 may use a laser 360 and a camera 370 or other type of optical detection device. The laser 360 may be a pulsed laser sheet with a fan out beam. The camera 370 may be a high speed imaging camera such as a charged coupled device ("CCD") camera. The operation of the laser 360 and the camera 370 are coordinated. For example, if a pair of laser pulses illuminates the focal plane of the camera 370, the corresponding images may be used to calculate the size and velocity of the droplets 300 in the frame. The controller 330 may locate the droplets 300 in the image, calculate their sizes, and create a size distribution curve. Averaging this size distribution curve for several frames may provide an estimate of the actual droplet size distribution. The controller 330 also can calculate the distance of droplet motion and hence the spray velocity may be estimated by dividing the distance by the time difference between frames. Other components and other configurations may be used herein.

Alternatively, or in addition to, the droplet size measurement system 340 may include a phase doppler anemometry ("PDA") system 370. Generally described, the PDA system 380 may use a pair of the lasers 360 and a pair of the cameras 370 or other types of optical devices. A pair of laser beams of the lasers 360 creates an interference pattern in a region of interest. The droplets 300 flowing through the region will scatter the light from regions of constructive interference. The cameras 370 then record the spatial scattering pattern. The doppler shift of the scattered light may be a measure of the particle velocity and the relative phase differences between the cameras 370 is a measure of the particle size. Other components and other configurations may be used herein.

Although both the PIV system 350 and the PDA system 380 provide detection in a localized region, overall distribution may be estimated by repeatedly carrying out measurements over extended periods. Multiple region measurements also may be made by deploying multiple systems. Other components and other configurations may be used herein.

Figure 4:
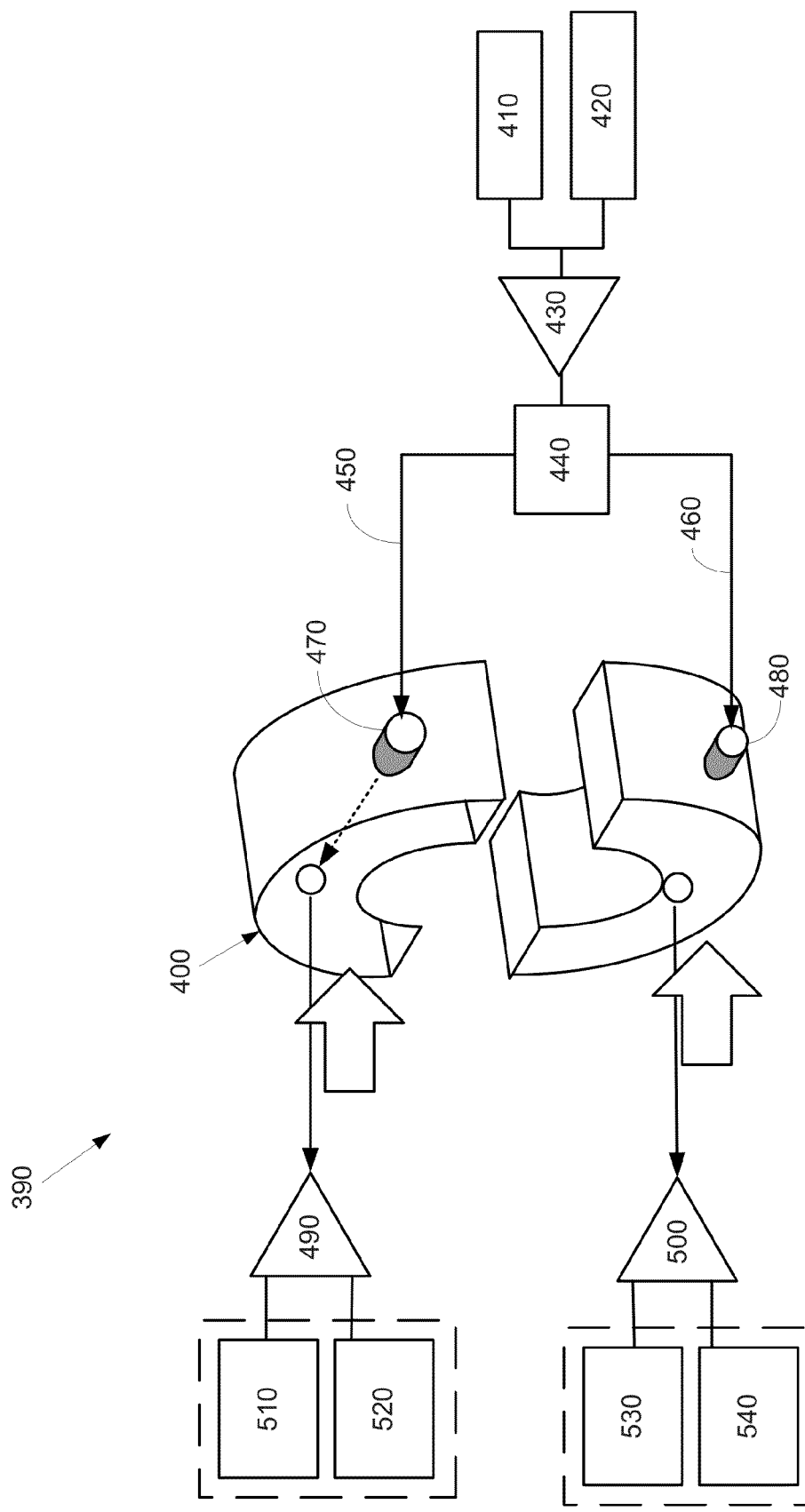
FIG. 4 is a perspective view of a tunable diode laser absorption spectroscopy system for use in the fogging control system of FIG. 2.

The fogging control system 320 also may be in communication with a humidity level measurement system 390. The humidity level measurement system 390 may be positioned about the inlet plenum 340 or the bellmouth 260 upstream of the compressor 120. The humidity level measurement system 390 may be based upon a tunable diode laser absorption spectroscopy ("TDLAS") system 400 as is shown in FIG. 4. The TDLAS system 400 may include a pair of tunable diode lasers, a first laser 410 and a second laser 420. The first and the second lasers 410, 420 may use different laser wavelengths. The first laser wavelength (e.g., about 945 nm) may be used to measure the contents of the water vapor phase while the second wavelength (e.g., about 1516 nm) may be used to measure the liquid water phase in the incoming droplets 300. Other wavelengths may be used herein. The two laser wavelengths thus probe absorption peaks of water vapor and liquid water.

Generally described, the lasers 410, 420 may be fiber coupled in a coupler 430 (50:50) and then multiplexed via a multiplexer 440 into an upper beam 450 and a lower beam 460. The upper beam 450 may be coupled to an upper port 470 about the inlet plenum 350 or the bellmouth 260 or elsewhere while the lower beam 460 may be coupled to a lower port 480. The upper beam 450 may be received by an upper splitter 490 while the lower beam 460 may be received by a lower splitter 500. The splitters 490, 500 both may be in communication with a pair of detectors. The upper splitter 490 may be in communication with an upper first wavelength detector 510 and an upper second wavelength detector 520 while the lower splitter 500 may be in communication with a lower first wavelength detector 530 and a lower second wavelength detector 540. Other components and other configurations may be used herein.

The intensity dip in the laser powers, after transmission through the droplets 300, may be used to calculate the line-of-site average concentration of the corresponding absorbing species. Specifically, the upper beam 450 may measure the molecular density of water in the vapor phase while the lower beam 460 measures the molecular density of water in the liquid phase. Using measured temperature and pressure values from the weather station 310, the controller 330 thus may calculate the moisture fraction of the droplets 300 in the incoming airstream 130. Other components and other configurations may be used herein.

Referring again to FIG. 2, the controller 330 of the fogging control system 320 thus may use the data received from the droplet size measurement system 340 and the humidity level measurement system 390 in a feedback loop to control the droplets via the water skid 290. Specifically, based upon the droplet size measurement data from the PIV system 350 and/or the PDA system 380 and the humidity level measurement data from the TDLAS system 400 for given nozzle design, the droplet size distribution can be controlled through the pressure of the water skid 290. By contrast, the saturation level may depend more on the water flow rate, residence time of the droplets in the inlet duct 230, droplet sizes, and any nozzle blockage or malfunction.

Figure 5:
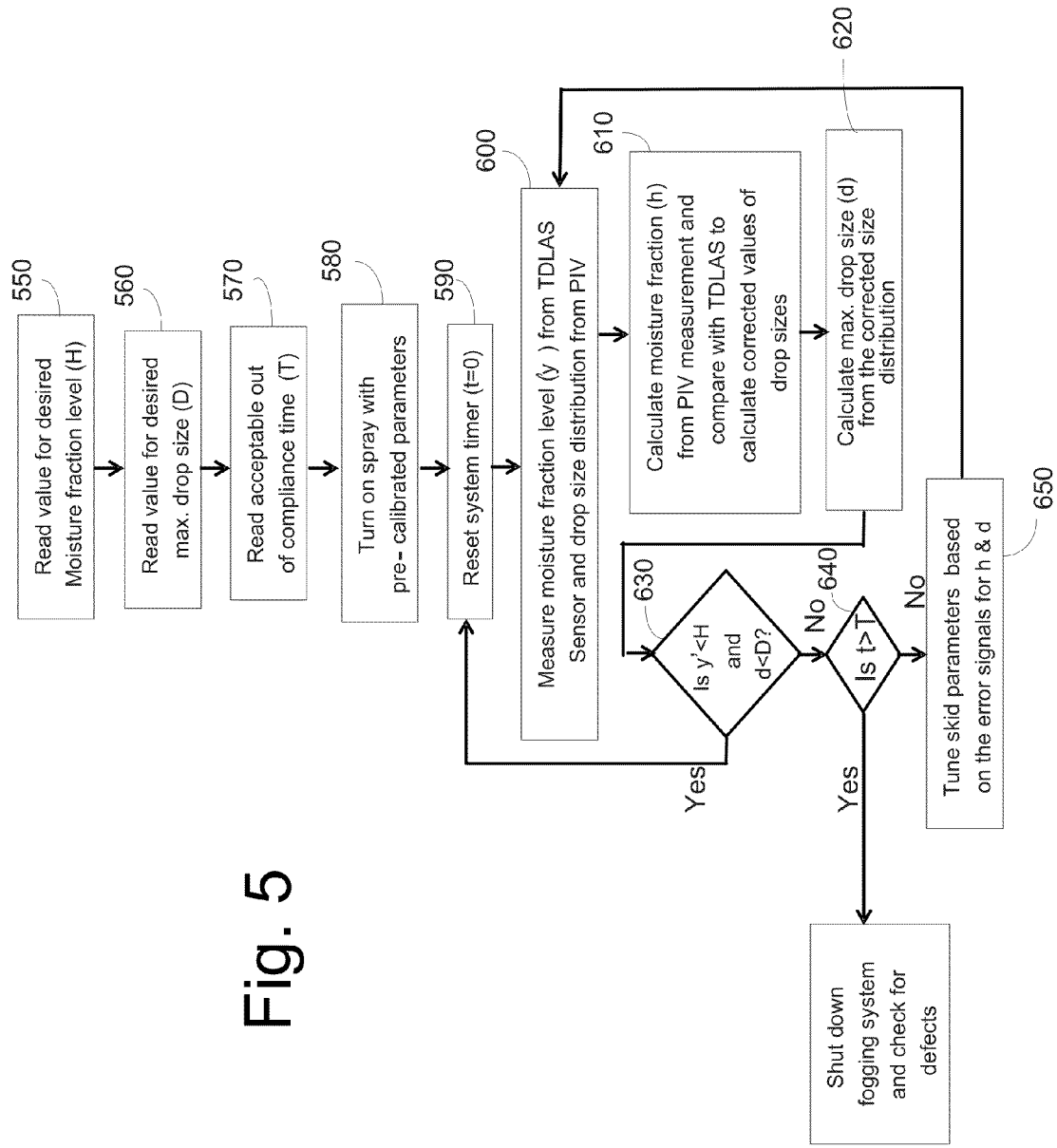
FIG. 5 is a flowchart showing the feedback logic of the fogging control system.

FIG. 5 shows an example of a feedback loop as may be used herein. Specifically, the fogging control system 320 may continually measure the droplet sizes and humidity levels. As soon as an abnormality is determined, the fogging control system 320 can automatically adjust the control parameters to bring the inlet air fogging system 100 back into the desired operating range. The time taken for the system 320 to adjust may depend on the response time of the measurements, on the average time for the measurements, and on the reaction time of the controller 330. The fogging control system 320 thus provides quick and reliable control over the fogging process on an ongoing basis.

At step 550, the controller 330 reads the input value for the desired moisture fraction level (H). At step 560, the controller 330 reads the inputted value for the desired maximum droplet size (D). At step 570, the controller 330 reads the inputted acceptable out of compliance time (T). At step 580, the controller 330 turns on the fogging nozzle array 270 with precalibrated parameters. At step 590, the controller 330 sets the timer to zero (t=0). At step 600, the controller 330 receives the moisture fraction level (y') from the TDLAS system 400 and the droplet size distribution from the PIV system 350. At step 610, the controller 330 calculates the moisture fraction from the PIV data and compares this data with the TDLAS data to calculate corrected values of the droplet sizes. This correction step logic will be described in more detail below. At step 620, the controller 330 calculates the maximum droplet size (d) from the corrected size distribution. At step 630, the controller 330 determines if the determined moisture fraction level (y') is less than the desired moisture fraction level (H) and whether the calculated maximum droplet size (d) is less than the desired maximum droplet size (D). If so, the controller 330 returns to step 590 and resets the system timer to zero. If not, the controller 330 continues to step 640 in which the controller 330 determines if the system time (t) is more than the acceptable out of time compliance (T). If so, the controller 330 shuts down the fogging system 100 so as to check for system defects. If not, the controller 330 advances to step 650 so as to tune overall system parameters based upon the error signals for the calculated moisture fraction (h) and the calculated maximum droplet size (d). The system then returns to step 600 and the loop is continued. Other types of control logic may be used.

The fogging control system 320 can use the moisture fraction values measured in the TDLAS system 400 to correct the droplet size distribution obtained from the PIV system 350/PDA system 380 as referenced in step 610 above. Specifically, the PIV images also can be used to estimate the moisture fraction. The imaging volume can be estimated from the laser sheet width and the camera imaging area. Based upon current temperature and pressures, the total number of water molecules in the imaging volume may be estimated. The total volume occupied by liquid water droplets may be calculated based upon the droplet diameters and the number of droplets from the image. The diameter of the droplet may be determined as follows for a single wavelength:

$$D_{Drop} = \frac{\int_a^b N(D)D^3 \, dD}{\int_a^b N(D)D^2 \, dD}$$

Likewise, the volume of a droplet may be calculated as follows:

$$C_w = \frac{\pi}{6} \int_a^b N(D)D^3 \, dD$$

The total volume may be multiplied by the water density so as to give the total mass of the water droplets and hence the total number of water molecules in the imaging volume. The moisture fraction thus may be calculated as follows:

$$Y = \frac{m_w}{m_w + m_v} = \frac{C_w \rho_w}{C_w \rho_w + (1 - C_w)\rho_w} \times 100\%$$

Similarly, the moisture fraction may be determined for multiple wavelengths as follows:

$$y = \Sigma Y = \frac{\rho_w \sum_i C_w^i}{\rho_w \sum_i C_w^i + \left(1 - \sum_i C_w^i\right)\rho_w} \times 100\%$$

Likewise, the TDLAS system 400 may calculate the moisture fraction as described above. Specifically, molecular density may be determined as follows:

$$N_i = \frac{\ln\left(\frac{I_0}{I}\right)}{S_{\eta\eta'}(T) \int_{v_1}^{v_2} f(v, v_0, T, P) L}$$

While the specific volume of the mix phase may be determined as follows:

$$v = \frac{N_{av}}{(N_i \times MW_{H_2O})}$$

The specific volume of the mix phase may be used to calculate the moisture fraction. The specific volume of the liquid and vapor phases thus may be calculated using thermodynamic tables:

$$y' = \frac{u - u_L}{u_v - u_L}$$

The controller 330 then may compare the moisture fraction value from the PIV system 350 with that determined by the TDLAS system 400. Because the TDLAS system 400 is based upon laser sensing techniques, the TDLAS results are expected to be more accurate than imaging techniques such as the PIV system 350. As such, the correction will enable more accurate droplet size measurements and hence enhance the accuracy of the control loop. Errors in the PIV system 350 may be caused by out of focus droplets and/or scattering due to droplets in the imaging path.

Figure 6:
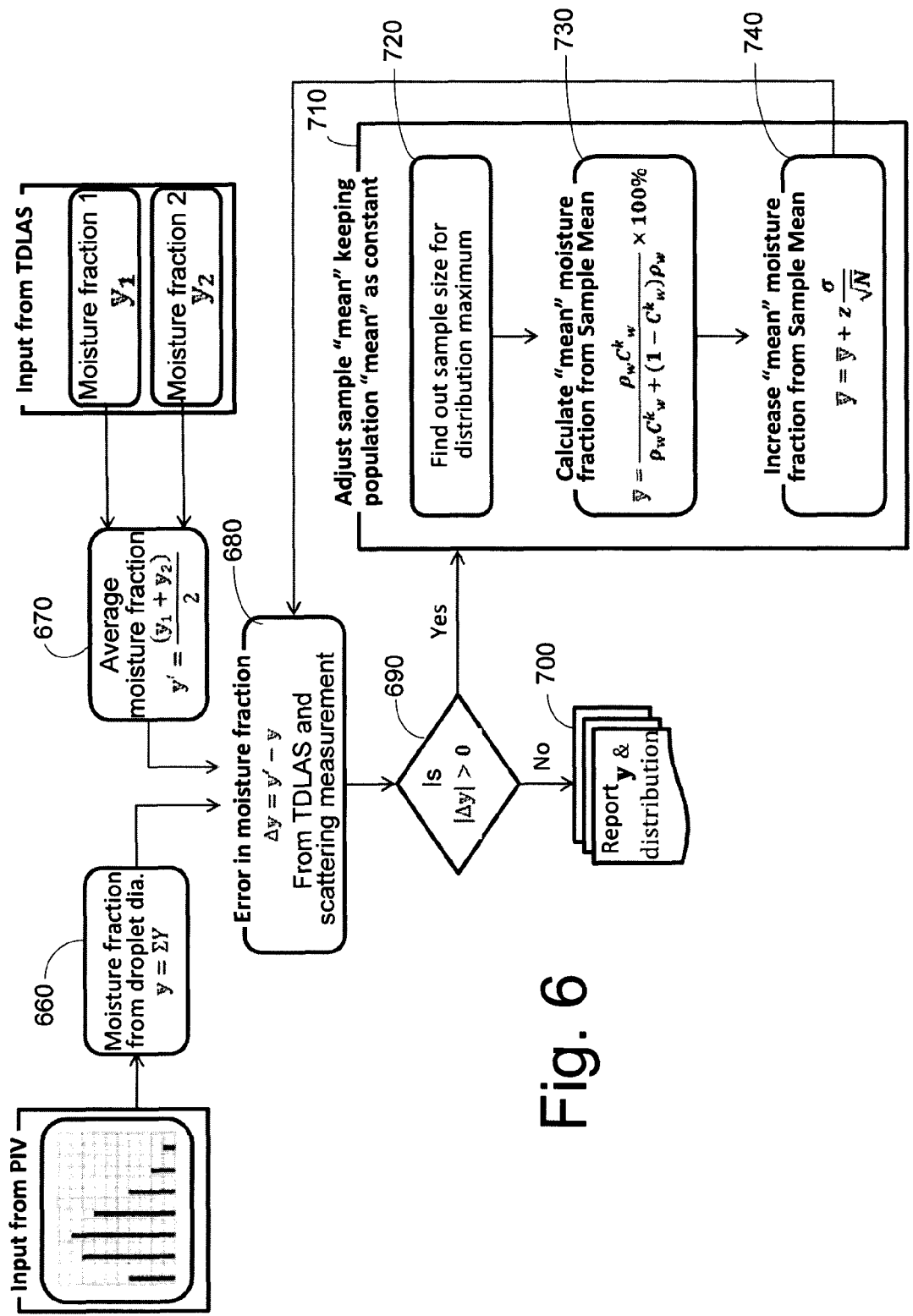
FIG. 6 is a flowchart showing the correction logic of the fogging control system.

Given such, FIG. 6 shows a flow chart explaining the correction step 610. At step 660, the controller receives the moisture fraction from the PIV system 350. At step 670, the controller 330 receives the average moisture fraction from the TDLAS system 400. At step 680, the controller determines the difference between the results of the PIV system 350 and the TDLAS system 400. At step 690, the controller 330 determines if the difference is greater than zero (0). If not, the controller 330 reports the moisture fraction at step 700. If so, the controller 330 adjusts the sample mean so to keep the population mean as a constant. This step involves the substeps of finding out the sample size for the distribution maximum at step 720, calculating the mean moisture fraction from the sample mean at step 730, and increasing the mean moisture fraction from the sample mean at step 740. Other types of control logic may be used herein.

The inlet air fogging system 100 thus provides control and optimization of the fogging process. Specifically, the fogging control system 320 uses the droplet size measurement system 340 and the humidity level measurement system 390 in a continuous feedback loop to provide quick and reliable control.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An inlet air fogging system for a gas turbine engine, comprising:
    an inlet plenum extending from a fogging nozzle array to a bellmouth;
    the fogging nozzle array positioned at the inlet plenum, and configured to inject fluid droplets into the inlet plenum; and
    a fogging control system in communication with the fogging nozzle array; the fogging control system comprising a droplet size measurement system and a humidity level measurement system, the fogging control system configured to adjust a droplet size distribution of fluid droplets injected by the fogging nozzle array;
    wherein the droplet size measurement system is positioned about the bellmouth and configured to measure a droplet size distribution of the fluid droplets entering the bellmouth;
    the humidity level measurement system is positioned about the bellmouth and configured to measure a humidity level and determine a moisture fraction level of fluid entering the bellmouth; and
    wherein the fogging control system is configured to adjust a droplet size of the fluid droplets injected by the fogging nozzle array when the moisture fraction is greater than a desired moisture fraction and when the droplet size distribution is greater than a desired droplet size distribution, based on feedback from the droplet size measurement system and the humidity level measurement system.

2. The inlet air fogging system of claim 1, further comprising a weather station and wherein the weather station is in communication with the fogging control system.

3. The inlet air fogging system of claim 1, further comprising a load sensor and wherein the load sensor is in communication with the fogging control system.

4. The inlet air fogging system of claim 1, wherein the droplet size measurement system comprises one or more lasers and one or more cameras.

5. The inlet air fogging system of claim 1, wherein the droplet size measurement system comprises a particle imaging velocimetry system.

6. The inlet air fogging system of claim 1, wherein the droplet size measurement system comprises a phase doppler anemometry system.

7. The inlet air fogging system of claim 1, wherein the humidity level measurement system comprises a tunable diode laser absorption spectroscopy system.

8. The inlet air fogging system of claim 1, wherein the humidity level measurement system comprises a first laser of a first wavelength and a second laser of a second wavelength.

9. The inlet air fogging system of claim 8, wherein the humidity level measurement system comprises a pair of first wavelength detectors and a pair of second wavelength detectors.

10. The inlet air fogging system of claim 1, further comprising a water skid and wherein the water skid is in communication with the fogging nozzle array and the fogging control system.

11. The inlet air fogging system of claim 1, wherein in the fogging control system comprises a controller to control the size of the droplets in the fogging nozzle array.

12. The inlet air fogging system of claim 1, wherein the fogging nozzle array is positioned about an inlet filter house.

13. An inlet air fogging system for a gas turbine engine, comprising:
    a fogging nozzle array configured to inject fluid droplets;
    a silencer positioned downstream of the fogging nozzle array; and
    a fogging control system in communication with the fogging nozzle array, the fogging control system configured to adjust a droplet size distribution of fluid droplets injected by the fogging nozzle array;
    the fogging control system comprising a particle imaging velocimetry system or a phase doppler anemometry system positioned downstream of the silencer to measure droplet size distribution and a tunable diode laser absorption spectroscopy system to measure humidity level and moisture fraction, wherein the fogging control system is configured to adjust an injection pressure of the fluid injected by the fogging nozzle, and the fogging control system is configured to adjust a droplet size distribution of fluid droplets injected by the fogging nozzle array when the moisture fraction is greater than a desired moisture fraction based on feedback from either the particle imaging velocimetry system or the phase doppler anemometry system and when the droplet size distribution is greater than a desired droplet size distribution based on feedback from the tunable diode laser absorption spectroscopy system.

14. The inlet air fogging system of claim 1, further comprising a silencer positioned in between the fogging nozzle array and the droplet size measuring system.

* * * * *